United States Patent [19]
Burland et al.

[11] Patent Number: 5,719,690
[45] Date of Patent: Feb. 17, 1998

[54] PHOTOREFRACTIVE GLASS ARTICLE

[75] Inventors: Donald Maxwell Burland; Robert James Twieg, both of San Jose, Calif.

[73] Assignee: International Business Machines Corporation, Armonk, N.Y.

[21] Appl. No.: 658,923

[22] Filed: May 31, 1996

[51] Int. Cl.$^6$ .................................................. G03H 1/02
[52] U.S. Cl. .................................................. 359/4; 430/2
[58] Field of Search .................... 359/3, 4, 7, 22, 359/24; 430/1, 2

[56] References Cited

U.S. PATENT DOCUMENTS

| | | | |
|---|---|---|---|
| 5,064,264 | 11/1991 | Ducharme et al. | 359/4 |
| 5,361,148 | 11/1994 | Bjorklund et al. | 359/3 |
| 5,460,907 | 10/1995 | Ducharme et al. | 385/141 |

OTHER PUBLICATIONS

S.-J. Kim et al., "Long–Term Stability of Supercooled Liquid of Branched Molecule", Journal of Materials Science Letters 14 (1995), 901–903.

T. E. Karis et al., "Organic Monomeric Glass Formation by Substituted Ethylenediamine", Journal of Non–Crystalline Solids 191 (1995) 293–303.

M. F. Molaire et al., "Organic Monomeric Glasses: A Novel Class of Materials", Journal of Polymer Science: Part A: Polymer Chemistry, vol. 27, 2569–2592.

S.-J. Kim et al.,"Glass Formation from Low Molecular Weight Organic Melts", J. Mater. Res., vol. 10, No. 8, Aug. 1995.

R. Twieg, Book Chapter Section—"Design Properties and Applications of Nonlinear Optical Chromophores" in Science and Technology of Organic Thin Films for Waveguiding Nonlinear Optics, Kajzar, F., Swalen, J. D. Editors (1996).

J. M. Maud et al., "Carbazolylalkyl Substituted Cyclosiloxanes: Synthesis and Properties", Synthetic Metals, 55–57 (1993) 890–895.

W. Moerner et al., Patent Application, "Optical Photorefractive Article", Serial No. 08/230,987, Filed Apr. 21, 1994.

*Primary Examiner*—Jon W. Henry
*Attorney, Agent, or Firm*—Robert B. Martin

[57] ABSTRACT

The invention relates to a photorefractive article for the transmission of radiation comprising an optical chromophore, a charge transport agent and a nonpolymeric organic glass matrix.

6 Claims, 1 Drawing Sheet

PHOTOREFRACTIVE GLASS ARTICLE

This invention was made with government support under Agreement No. MDA972-94-2-0008 (ARPA Order No. A576) awarded by the Advanced Research Projects Agency. The government has certain rights in this invention.

FIELD OF THE INVENTION

The present invention relates to an optical photorefractive glass article.

BACKGROUND OF THE INVENTION

The photorefractive effect involves light-induced charge redistribution in a nonlinear optical material to produce internal electric fields which, by virtue of the optical nonlinearity, produce local changes in the index of refraction such that dynamic, erasable holograms are formed which diffract light. The photorefractive effect is achieved by exposing the material to an optical intensity pattern consisting of bright and dark regions, such as formed by interfering two coherent laser writing beams of the same polarization. Mobile charge generated in the material migrates to form internal space charge electric fields which create refractive index variations due to the electrooptic effect. These variations in refractive index in the photorefractive material are known as index gratings. The index gratings diffract light and are useful for a variety of applications, including storage of holographic images, diffractive optical elements, and photorefractive two-beam coupling.

Inorganic crystals exhibiting the photorefractive effect are well known in the art as described in Guenter and Huignard, "Photorefractive Materials and Their Applications", Vols. I and II ("Topics in Applied Physics", Vols. 61 and 62) (Springer, Berlin, Heidelberg, 1988). Inorganic photorefractive crystals have been fabricated into optical articles for the transmission and control (change in phase, intensity, or direction of propagation) of electromagnetic radiation, as well as for holographic image and data storage.

However, it is technically difficult to fabricate such crystals into desired large area samples or thin-layered devices such as optical wave guides or multiple layer stacks. Further, it is difficult to dope crystalline material with large concentrations of dopants in order to achieve desired property improvements, such as increase in the speed and/or magnitude of the photorefractive effect, because dopants are often excluded from the crystals during growth.

Certain polymeric photorefractive materials have been described by Ducharme et al., U.S. Pat. No. 5,064,264, and Schildkraut et al., U.S. Pat. No. 4,999,809. These polymeric materials can be fabricated into thin-layered devices such as optical wave guides and multilayer stacks. Further, they can be readily doped with materials to improve a photorefractive effect.

Schildkraut describes a photorefractive device having a layer of material comprising a sensitizer, a charge transporting layer, a binder, and an organic molecular dipole, which has been poled in an electric field at elevated temperatures so that the alignment of the molecular dipoles remains for long times at ambient temperatures. Although the material is shown to have light-induced changes in measured properties, Schildkraut does not show the formation of a photorefractive grating to demonstrate a photorefractive device.

Ducharme et al., describe photorefractive materials comprising a polymer, a nonlinear optical chromophore, a charge transport agent, and optionally a charge generater. The charge transport agent can be dispersed in the polymer binder or alternatively covalently bonded to or incorporated in the polymer backbone to form a photoconductive polymer.

Although Ducharme's materials are useful in certain applications, there still is a desire in the industry for a photorefractive article having a high diffraction efficiency in combination with good mechanical, optical and ease-of-fabrication properties.

It is therefore an object of the present invention to provide an improved photorefractive article. Other objects and advantages will be apparent from the following disclosure.

SUMMARY OF THE INVENTION

The present invention relates to a photorefractive article for the transmission of radiation comprising an optical chromophore, a charge transport agent and a nonpolymeric organic glass matrix. The article has a diffraction efficiency greater than 0.1%. The key feature of the present invention is the nonpolymeric organic glass matrix. Optionally, the article also comprises a sensitizer and a charge generator.

The present invention also relates to a holographic storage device.

A more thorough disclosure of the present invention is presented in the detailed description which follows.

DETAILED DESCRIPTION OF THE INVENTION

Figure 1:
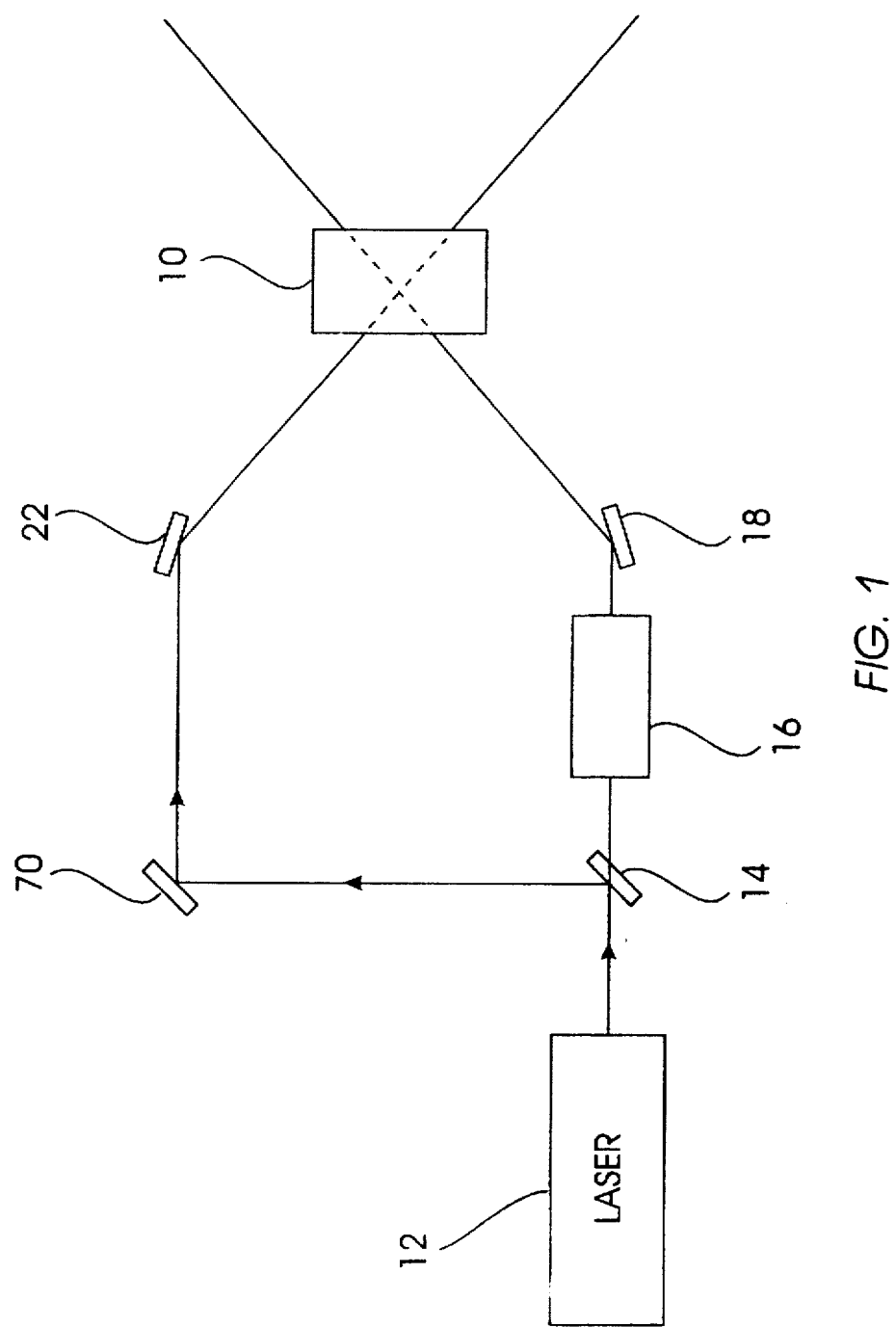
FIG. 1 is a drawing of a storage device having the optical article of the present invention.

The present invention relates to an optical photorefractive article for the transmission of electromagnetic radiation comprising an optical chromophore, a charge transport agent, and a nonpolymeric organic glass matrix. The key feature of the present invention is the nonpolymeric organic glass matrix. As used herein, nonpolymeric organic glass is a carbon containing amorphous solid comprising organic molecules which can be monomers, dimers, trimers, tetramers, pentamers, or hexamers. The glass matrix provides the optical article with improved optical quality and ease of fabrication.

Suitable monomeric glass matrix include sol-gels, cyclic carbazoly $C_{1-5}$ alkyl substituted siloxane pentamer, 1,3,5-tri($\alpha$-naphthyl) benzene, 1,3,5-tris[N-4-diphenylaminophenyl)phenylphenylamino] benzene and hydrazones e.g., N-(diphenyl)-diethyalaminophenyl hydrazone; N-(diphenyl)-diphenylaminophenyl hydrazone and N-(methyl)-N-(phenyl)-diphenylaminophenylhydrazone; 2-$\alpha$-methylbenzyl)amino-5-nitropyridine; 2-cyclooctylamino-5-nitropyridine; p-nitroanilinoglutarimide and (4-nitrophenylvinylene) julolidine and imidazoles such as 2,4,5-tris (4-biphenyl) imidazole and 2-(4-phenylsulphonylphenyl) 4,5 bis (4-biphenyl) imidazole. Other suitable glass will be known to those skilled in the art such as disclosed in Molaire et al., J. of Polymer Science 27 2569 (1989); Kim et al., J. Mater. Res. 10 2128 (8/95) and Karis et al., J. of Non-Crystalline Solids 191 293 (1995) the disclosures of which are incorporated herein by reference for all purposes. The article of the present invention preferably comprises greater than 50 weight % of the glass matrix, more preferably greater than 70 weight % of the glass matrix. Preferably, the optical chromophore of the article will be a glass.

The optical chromophore of the present invention is a nonlinear optical chromophore or a linear chromophore with substantial polarization anisotropy (collectively referred to as NLO chromophore). The organic molecule serving as the NLO chromophore has unsymmetrical, polarized, π or σ electrons between an electron donor group and an electron acceptor group. The NLO chromophore has a permanent electric dipole moment in the ground electronic state. Preferred NLO chromophores for use in the present invention are:

1. benzimidazolines such as:
   1,3-dimethyl-2,2-tetramethylene-5-nitrobenzimidazoline,
   1,3-dimethyl-2,2-dimethyl-5-nitrobenzimidazoline
   1,3-dimethyl-2,2(2 methyl-tetramethylene)-5-nitro benzimidazoline
   1,3-dimethyl-2,2-pentamethylene-5-nitrobenzimidazoline 2. (+)-2-(α-methylbenzyl)amino-5-nitropyridine
3. 4-piperidinobenzylidenemalononitrile
4. a substituted stilbene such as 2-trifluoromethyl-4-nitro-4'-methoxystilbene
5. Tolanes
6. a substituted styrene having the general structure

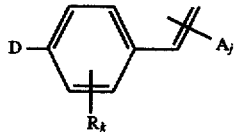

wherein D is an electron donating group such as alkoxy, aryloxy, thioalkyl, thioaryl, amino, alkylamino, or arylamino which is located preferably in the para position; wherein $A_j$ is one or more of the electron withdrawing groups such as nitro, cyano, sulfonyl, carbonyl, or alkoxycarbonyl and which member j=1, 2, or 3 and are attached to the styrene at the $\beta_{trans}$, $\beta_{cis}$ or α positions and also the electron withdrawing groups such as nitrovinyl, dicyanovinyl, tricyanovinyl, and nitrophenyl when attached to the $\beta_{trans}$ position; and wherein $R_k$ is an additional substituent on the aromatic ring including halogen, alkyl, perfluoroalkyl, and alkoxy which are introduced so as to further influence the transparency, nonlinearity, and solubility of the chromophore as a function of their exact identity, number, and location. A preferred substituted styrene is 4,N,N'-di(p-toly) amino-β,β-dicyanostyrene.

7. azobenzene having 4,4' donor/acceptor substituents such as 4-alkoxy (e.g. methoxy) or amino and 4' nitro, cyano or sulfo optionally having lower $C_{1-6}$ alkyl ring substituents (e.g. 2,5 dimethyl).

8. heterocyclic compounds having the following formula including isomers thereof:

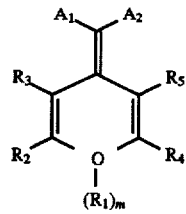

wherein $A_1$ is hydrido, $C_{1-8}$ alkyl, aryl (e.g., benzyl, phenyl) or $A_2$; $A_2$ is cyano, nitro, $C_{1-6}$ alkylcarbonyl, sulfonyl, $C_{1-6}$ alkylsulfonyl, sulfinyl, $C_{1-6}$ alkylsulfinyl, or $C_{1-6}$ alkylcarboxy or $A_1$ and $A_2$ together are an electron acceptor ring substituent e.g., 1,3 cyclo $C_{5-6}$ alkyldione, (1,3 cyclohexyldione or benzo cyclo pentadione) or cyclo $C_{4-7}$ alkyldiene; D is a nitrogen, phosphorous or sulfur atom; $R_1$ is hydrido, $C_{1-6}$ alkyl, aryl (benzyl, phenyl), amino, $C_{1-6}$ alkylamino, phenylamino or benzylamino; m is 1 when D is nitrogen or phosphorous and 0 when D is sulfur; $R_2$, $R_3$, $R_4$ and $R_5$ are each independently hydrido, $C_{1-8}$ alkyl, aryl such as phenyl, benzyl, or $R_2$ and $R_3$ or $R_4$ and $R_5$ together form an aromatic ring such as a 6 member aromatic ring. Preferred compounds are the dihydropyridines where D is nitrogen.

Other suitable NLO chromophores will be known to those skilled in the art such as disclosed in Ducharme et al., U.S. Pat. No. 5,460,907, Guenter and Huigard "Photorefractive Materials and Their Applications", Vol. I and II ("Topics in Applied Physics" Vols. 61 and 62) (Springer, Berlin, Heidelberg 1988), Y. Zhang, et al., Adv. Mater., 8 (2), 111–125 (1996), W. E. Moerner et al., Chem. Rev., 94 127 (1994), and Yu et al., Acc. Chem. Res., 29, 13 (1996) the disclosures of which are incorporated herein by reference for all purposes. The benzimidazolines and dihydropyridines also function to transport charge obviating the need for a separate charge transporting agent.

The substituted 4 methylene dihydropyridines where $A_1$ is cyano $A_2$ is alkylcarboxy, $R_3$ and $R_5$ are hydrido; $R_2$ and $R_4$ are methyl and $R_1$ is lower alkyl have glassy character and can be utilized without a separate glass matrix as a the photorefractive article.

The optical article of the present invention also comprises a charge transport agent. Suitable charge transport agents for the transport of holes are triphenylamines, substituted carbazoles (e.g., carbazoles with hydrazonomethyl substituent) and hydrazones such as aldehyde-N-diphenyl hydrazones e.g., p-diethylamino- benzaldehyde diphenylhydrazone, amino-substituted aryl methanes, pyrazolines, oxazoles, oxadiazoles, and amino-substituted stilbenes and nitro-substituted fluorenones for the transport of electrons. Other suitable charge transport agents for use in the present invention will be known to those skilled in the art such as those disclosed in Ducharme above and in "Electronic Properties of Polymers" Mort and Pfister, Wiley, 1982, and Appendix 3 of Borsenberger et al. "Organic Photoreceptors for Imaging Systems" (1993) the disclosures of which are incorporated herein by reference for all purposes.

Preferably, the optical article also comprises a minor amount of a sensitizer (charge generator). Preferably, the article can comprise about 0.1 to about 5 weight % of the sensitizer, more preferably about 0.2 weight % (e.g., 0.1 to 0.4 weight %). The optical article is preferably doped with a minor amount of a sensitizer to generate charge upon exposure to electromagnetic radiation. Suitable sensitizers for use in the process of the present invention include preferably tri-nitrofluorenone (TNF), or fullerenes such as $C_{60}$ and $C_{70}$, perylene dyes such as perylene dicarboxyimide, thiapyrylium dyes, squarylium dyes, and charge transfer complexes such as anthracene/tetracyanoquinodimethane. Other sensitizing agents will be known in the art such as those disclosed in Ducharme and Borsenberger above.

The article of the present invention can be formed by dispersing the photorefractive components such as NLO chromophore, charge transport agent and sensitizer into the glass melt with subsequent controlled cooling.

The article generally comprises about 20 to 50 weight % of the NLO chromophore, 20 to 50 weight % of the charge transport agent and the remainder glass matrix.

Optionally, the optical article of the present invention can be doped with minor mounts (e.g., less than about 2 to 10 weight % preferably less than 5 weight %) of a variety of other components known to those skilled in the art. Such components include charge-trapping agents and other agents to modify the glass and photorefractive properties.

The photorefractive article of the present invention has good optical clarity (low scattering and transparency in the visible spectrum). The photorefractive article has a diffraction efficiency greater than 0.1%, preferably greater than 1% and more preferably greater than 50%. The glass matrix has a low melt viscosity for ease of processing and the nonpolymeric nature provides greater compatibility with the other components.

The articles of the present invention can be used for the transmission and control (change phase, intensity, or direction of propagation) of electromagnetic radiation by art-known techniques. The article of the present invention can be utilized in a variety of applications such as optical phase conjugation, optical beam deflection, holographic optical data and image storage, optical interconnection, coherent optical amplification, optical limiting, beam fanning, and self-phase conjugation. The methods for making such optical devices are known to those skilled in the art as disclosed in Guenter and Huignard Y. Zhang, et al.; and W. E. Moerner et al., referenced above.

The photorefractive article of the present invention can be utilized in a holographic recording method comprising the steps of:

1) generating and intersecting two beams of coherent electromagnetic radiation of the same polarization (the reference and object beams) in the photorefractive article of the present invention; and 2) impressing spatial information on the object beam.

In the first step of the method, a radiation source provides a beam of coherent monochromatic radiation. Suitable radiation sources include lower power continuous wave lasers such as diode lasers, Ti sapphire, Nd:YAG laser and repetitively Q switched lasers. The coherent beam is then split with a beam splitter into a reference beam and an object beam. The object beam is then spatially modulated.

To ensure that a meaningful interference pattern is produced, the object and reference beams have a fixed phase relationship. Thus, these beams are suitably produced by a single coherent laser radiation source. Spatial modulators for modulating the object beam are conventional in the art and include, for example, liquid crystal modulators, electro-optic modulators, Si micromechanical reflection modulators, magneto-optic modulators, and acousto-optic modulators. Such modulators are discussed in "The Physics of Optical Recording" by K. Schwartz, Springer-Verlag, 1993 which is incorporated herein by reference for all purposes.

In the second step of the method, the reference beam and object beam are recombined (intersected) in the photorefractive article to form an interference pattern in a recording region of the article. The intersecting beam of radiation create charge carriers. The charge carrier then move in response to the optical grating to form a charge grating in the article to record the hologram. Holograms can be recorded by angular or frequency multiplexing.

The recorded information is then read from the photorefractive article with a monochromatic read beam having the same wavelength as the writing beam. The light from the reading beam is diffracted by the article. The diffracted beam then conveniently passes through a lens to produce a holographic image of the data representation which is captured by a detector array such as a charge-coupled device (CCD). Output from the detector array can be converted into a serial binary form suitable to input into standard computer central processing units. Reading of the article does not cause erasure of the charge grating.

Referring to FIG. 1, the present invention also relates to a holographic storage device comprising:

1) the recording article 10 of the present invention;
2) a laser 12 to form a laser beam;
3) a beam splitter 14 for splitting the laser beam into two beams of coherent electromagnetic radiation of the same polarization (the reference and object beams);
4) a modulator 16 for impressing spatial information on the object beam; and
5) one or more mirrors 18, 20 and 22 to direct the object and reference beam to intersect in the recording medium.

Preferably, the device is provided with a plurality of mirrors and with means for controlling the reference beam's angle for angular multiplexing such as a deflector element comprising a galvanometer scanner or acousto optic beam deflector. The device is generally provided with means for providing an external electric field such as by imposing a voltage across electrodes disposed on the article. The operational parameters for holographic storage and components for holographic storage devices are well known in the art for crystalline photorefractive material such as disclosed in Collier et al., Optical Holography, Chapter 16, Academic Press (1991) the disclosure of which is incorporated herein by reference for all purposes.

The following examples are detailed descriptions of the process of the present invention. The detailed preparations fall within the scope of, and serve to exemplify, the more generally described methods set forth above. The examples are presented for illustrative purposes only, and are not intended as a restriction on the scope of the invention.

EXAMPLE 1

Ethyl 1-(2-ethylhexyl)-2,6-dimethyl-1,4-dihydropyridine-4-ylidene cyanoacetate

In a 250 ml round bottom flask equipped with stirbar and nitrogen bubbler was placed ethyl 2,6-dimethyl-4H-pyran-4-ylidenecyanoacetate (4.38 g, 20 mmol), 1-propanol (20 ml) and 2-ethylhexylamine (12.92 g, 100 mmol). The mixture was briefly brought to a boil and then allowed to cool to room temperature with stirring. After stirring at room temperature for one hour the reaction was complete and 10% aqueous HCl was added dropwise (200 ml) with stirring. The solid product was isolated by suction filtration, washed with water and air dried. The crude product was taken up in boiling methylcyclohexane, hot filtered and cooled and the product collected by suction filtration as white crystals, yield 5.85 g (88%). Glass transition temperature (Tg) was 8° C.

EXAMPLE 2

Methyl 1-(2-butyl)-2,6-dimethyl-1,4-dihydropyridine-4-ylidene cyanoacetate

In a 500 ml round bottom flask equipped with stirbar and nitrogen bubbler was placed methyl 2,6-dimethyl-4H-pyran-4-yldenecyanoacetate (100.11 g, 50 mmol), N-methylpyrrollidinone (50 ml) and 2-aminobutane (7.3 g, 100 mmol). The resulting mixture was heated in a 75° oil bath for four hours after which time all the pyran was consumed. The resulting solution was chilled in an ice water bath and ice water (350 ml) was added dropwise with stirring. The solid product was isolated by suction filtration, washed with ice water and then air dried. The material was recrystallized first from a mixture of methanol and water and then again from methanol to give the product as a white powder, yield 9.0 g (69%). Tg=25° C.

EXAMPLE 3

Two photorefractive articles were prepared by forming a film of each of Example 1 and Example 2 with a sensitizer.

Using a four-wave-mixing geometry known in the art, two mutually coherent writing beams overlapping in an angle of 22° at a wavelength of 676 nm were used to write a hologram in the article. A third reading beam counterpropagating along the direction of one of the writing beams was used to produce a beam which was diffracted from the grating. Diffraction efficiencies were measured by recording the ratio between the power in the diffracted beam and the power in the original reading beam.

The sample could only be read out with an external electric field applied. Each sample exhibited photorefractivity. For samples of 150 micron thickness, the diffraction efficiency was observed to essentially reach 100%, aside from reflection and absorption losses at external electric fields between 30 and 60 V/micron. This performance indicates that the modulation in the refractive index at these fields is on the order of $1 \times 10^{-3}$ to $9 \times 10^{-3}$. Higher index modulations should be available at higher fields. The steady-state performance of samples of Examples 1 and 2 was similar, but the response time of Example 1 was on the order of seconds, while the response time of Example 2 was on the order of 2 hours. A variation of example 2, in which poly(methyl)methacrylate (PMMA) was added to the material in the amount of 10% by weight, exhibited essentially identical photorefrative behavior, but with response times on the order of minutes rather than hours. All holographic gratings could be erased with either of the writing beams alone, with or without the external electric field. After it has been erased, the article is prepared to accept the formation of a new grating pattern. The samples were found to withstand external electric fields as high as 66 V/micron for periods as long as several days.

Although this invention has been described with respect to specific embodiments, the details thereof are not to be construed as limitations for it will be apparent that various embodiments, changes, and modifications may be resorted to without departing from the spirit and scope thereof, and it is understood that such equivalent embodiments are intended to be included within the scope of this invention.

We claim:

1. A photorefractive article for the transmission of electromagnetic radiation comprising an optical chromophore, a charge transport agent and a nonpolymeric organic glass matrix, the article having a diffraction efficiency greater than 0.1%.

2. The article of claim 1 wherein the glass matrix is cyclic carbazolalkylsiloxane pentamer.

3. The article of claim 2 wherein the nonlinear optical chromophore is selected from 4 (alkoxy or amino), 4' (nitro or cyano) azobenzene or benzimidazoline.

4. A holographic storage device comprising:
   (i) an optical article comprising an optical chromophore, a charge transport agent and a nonpolymeric organic glass matrix, the article having a diffraction efficiency greater than 0.1%;
   (ii) a laser for forming a beam of coherent electromagnetic radiation;
   (iii) a beam splitter for splitting the beam into an object and reference beam;
   (iv) a modulator for impressing spatial information on the object beam; and
   (v) a mirror to cause the object beam and reference beam to intersect in the optical article.

5. The device of claim 4 wherein the glass matrix is cyclic carbazolyalkylsiloxane pentamer.

6. The device of claim 5 wherein the nonlinear optical chromophore is selected from 4 (alkoxy or amino), 4' (nitro or cyano) azobenzene or benzimidazoline.

* * * * *